United States Patent [19]

Kamiguchi et al.

[11] Patent Number: 5,238,617

[45] Date of Patent: Aug. 24, 1993

[54] METHOD OF MONITORING RESIN POSITION IN MOLD CAVITY

[75] Inventors: Masao Kamiguchi; Noriaki Neko, both of Oshino, Japan

[73] Assignee: Fanuc Ltd., Minamitsuru, Japan

[21] Appl. No.: 927,649

[22] PCT Filed: Jan. 14, 1992

[86] PCT No.: PCT/JP92/00023

§ 371 Date: Sep. 9, 1992

§ 102(e) Date: Sep. 9, 1992

[87] PCT Pub. No.: WO92/11995

PCT Pub. Date: Jul. 23, 1992

[30] Foreign Application Priority Data

Jan. 14, 1991 [JP] Japan .................. 3-015960

[51] Int. Cl.$^5$ .................................... B29C 45/76
[52] U.S. Cl. ........................ 264/40.1; 264/40.4; 264/328.12; 425/140; 425/147
[58] Field of Search .............. 264/40.1, 328.1, 328.12, 264/40.4, 40.5; 425/135, 145, 140, 147

[56] References Cited

U.S. PATENT DOCUMENTS 4,832,883 5/1989 Kato et al. .................. 264/40.1

FOREIGN PATENT DOCUMENTS 61-197214 9/1986 Japan.

OTHER PUBLICATIONS

Rosato, Dominick V., *Injection Molding Handbook*, 1986, pp. 98-102.

*Primary Examiner*—Jill L. Heitbrink
*Attorney, Agent, or Firm*—Staas & Halsey

[57] ABSTRACT

A method of monitoring a resin position intended to automatically display the relationship between the state of resin injected into the cavity and the screw position for monitoring. In the cavity, border sections where flow resistance of the injected changes are determined. Subsequently, a volume is found for each of the regions partitioned by the border, and the obtained volume is set into the control unit of the injection molding machine. The control unit displays the injection completion position when the amount of cushion Lc is inputted (200, 201). Moreover, the amount of a screw stroke Sj is determined on the basis of the volume determined for each of the positions having different flow resistance, and a screw diameter. Each amount of the screw stroke Sj is added to the amount of cushion Lc in sequence to find screw positions, which are to be displayed as injection speed changeover positions (203).

8 Claims, 3 Drawing Sheets

METHOD OF MONITORING RESIN POSITION IN MOLD CAVITY

DESCRIPTION

1. Technical Field

The present invention relates to a method of monitoring the front end of flowing resin poured into a mold cavity.

2. Background Art

When setting injection conditions, there is a need for the injection speed to be determined depending on the flow resistance to which the resin passing through the cavity is subjected. The cavity has a different flow resistance for each region. For example, the flow resistance is caused to change when the resin flowing through the cavity is to be subjected to an abrupt change in the sectional area of passage due to the change in the sectional configuration of the cavity, or when the direction of the resin flow has changed extremely. Accordingly, the changeover positions of the injection speed must be set in consideration of the state of the resin to be poured into the cavity. It should be noted that the injection speed herein means a speed at which the resin is injected through a nozzle of an injection molding machine, in other words, the amount of molding material or resin to be injected into the cavity per unit time.

Conventionally, a short shot method has been used to check the state of resin filling the cavity. This short shot method comprises the steps of opening a mold after injecting a small amount of resin to check the amount of resin poured into the cavity, increasing the amount of the injected resin in sequence, finding screw positions where the flow resistance changes based on the position of the resin which has been injected into the mold, and determining the changeover position of the injection speed based on these screw positions.

In this short shot method as described above, the amount of resin must be increased a little at a time for injection, and the mold must be opened to check the position of the front end of the resin poured into the mold every time the injection is executed, which is a time and labor consuming work. Also, the short shot method may not be applied to some kind of molds, for example, for connectors. In addition, the mold may be damaged due to an excessive filling of resin in the process of searching for the injection conditions using the short shot method. This is a problem of this method.

Furthermore, it is important to determine the relationship between the state of resin injected into the cavity and the screw position, not only for determining the changeover position of the injection speed but also for providing a reference in determining the injection speed and injection pressure.

DISCLOSURE OF THE INVENTION

The object of the present invention is to provide a method of monitoring a resin position within a cavity through an automatic display of the relationship between a state of resin injected into the cavity and the screw position.

In order to achieve the above object, the first aspect of the present invention comprises the steps of:

partitioning the mold cavity into a plurality of regions with border sections where flow resistance of poured resin undergoes a great change;

setting volumes of thus partitioned regions into a control unit of an injection molding machine; and displaying on the display unit screw positions when the leading end of the resin reaches the border sections, and a screw back position, based on a screw diameter, the amount of cushion which has been set, and said volumes of the regions, through said control unit.

Furthermore, the second aspect comprises the steps of:

partitioning the mold cavity into a plurality of regions with border sections where flow resistance of poured resin undergoes a great change;

setting volumes of thus partitioned regions into a control unit of an injection molding machine; and displaying on the display unit screw positions at the time when the front end of the resin reaches the border sections in the cavity, based on a screw diameter, a screw back position which has been set, and said volumes of the regions, through said control unit.

Preferably, the injection molding machine is controlled by the control unit having a processor, and said volumes of the regions are determined at the time of designing the mold by CAD system so as to be set into said control unit.

More preferably, on a display screen there appear a screw coordinate axis and a picture of a cylinder corresponding to said screw coordinate axis, and on said screw coordinate axis there are plotted indexes each representing a screw back position, a screw position corresponding to the amount of the cushion, and screw positions where the front end of the resin reaches the border sections in the cavity so that the picture of the screw resting on each position can be correspondingly plotted on the cylinder being displayed.

More preferably, said display screen further displays a picture of the cavity section and the border sections.

Let v be the volume of a region within the cavity, D be the diameter of the screw, and S be the amount of the screw stroke (screw displacement) required to fill the region having the volume v with resin, then the following relationship is established.

$$S = v/[(D/2)^2 \cdot \pi] \qquad (1)$$

Therefore, substitute the total volume V of the cavity for v in the above expression (1) to find the amount of a screw stroke S enough to fill the entire cavity with resin. As a result, a screw back position can be obtained by adding the amount of cushion, which has been set, to the amount of screw stroke S. Subsequently, a screw stroke is determined in accordance with the above expression (1) for each of volumes of the regions having differently set flow resistances, and the corresponding screw strokes are sequentially determined for the regions in the order of precedence to be filled with resin. The obtained values are added in sequence, and, based on the results and the above screw back position, a screw position, where the front end of the resin reaches each of the border positions having different flow resistances, is determined. On the other hand, in the order reverse to the order according to which the resin is injected into the regions, the corresponding screw strokes may be determined in sequence. The obtained values are sequentially added, and, based on the results and the amount of cushion, a screw position, where the front end of the resin reaches each of the border positions in the cavity having different flow resistances, is determined.

BEST MODE FOR CARRYING OUT THE INVENTION

An embodiment of the present invention will now be described with reference to the accompanying drawings.

Figure 4:
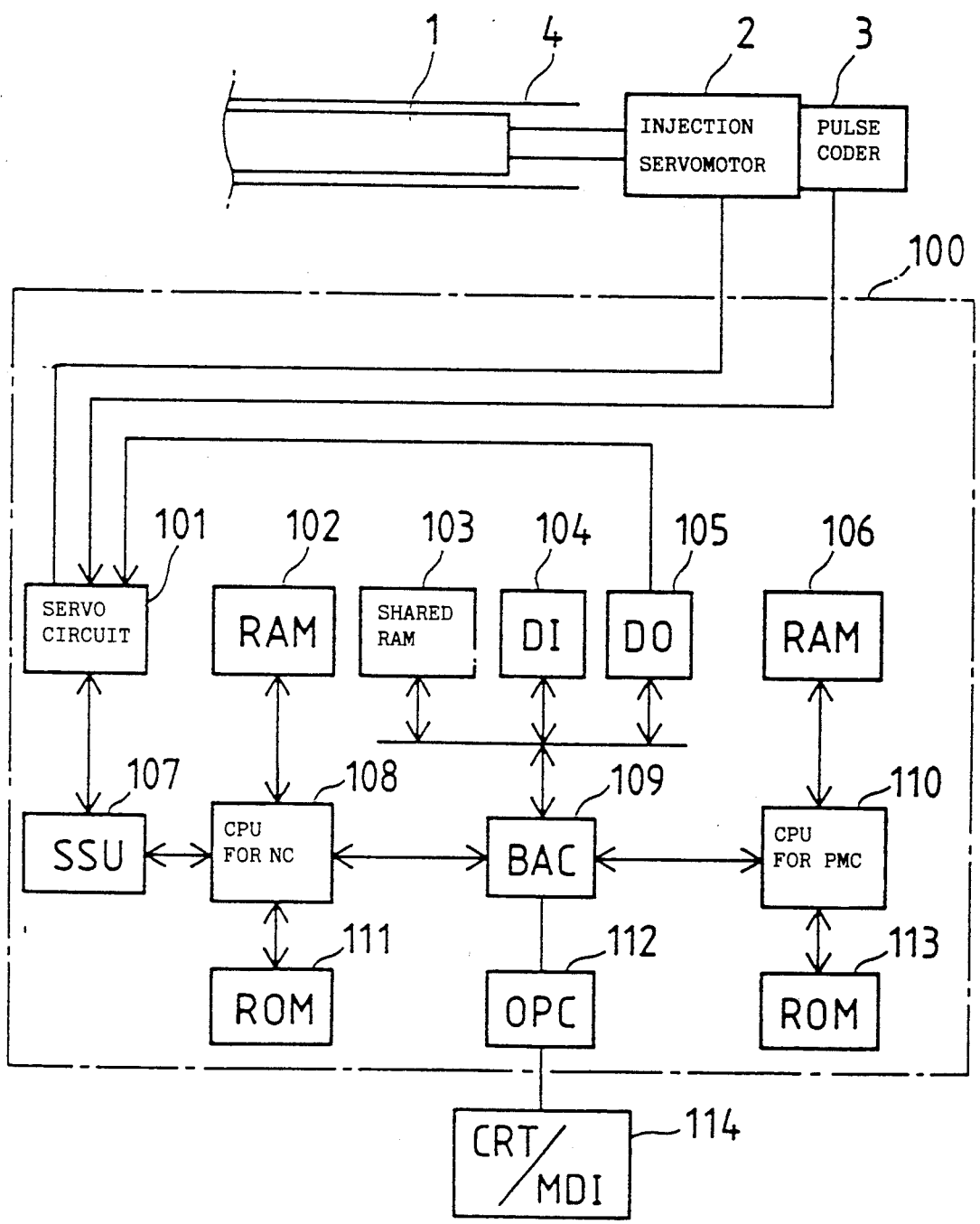
FIG. 4 is a block diagram illustrating a principal part of the injection molding machine for practicing one embodiment in accordance with the present invention.

FIG. 4 illustrates an electrically driven injection molding machine which is an embodiment for practicing a method in accordance with the present invention as well as a principal part of a control system thereof. Referring to this drawing, the electric injection molding machine comprises a numeric control system 100 serving as a control system, a screw 1, a heating cylinder 4, an injection servomotor 2 for axially driving the screw 1, and a pulse coder 3 affixed on the injection servo motor 2. The numerical control system 100 (referred to as an NC system hereinafter) for controlling the injection molding machine includes a microprocessor 108 (referred to as a CPU hereinafter) for numerical control or NC, and a CPU 110 for a programmable machine controller (referred to as a PMC hereinafter). The CPU 110 for the PMC is connected to a ROM 113 which stores, for example, a sequence program for controlling a sequential operation of the injection molding machine, and a RAM 106 used for temporarily storing data.

The CPU 108 for NC is connected to a ROM 111, which stores a manager program for generally controlling the injection molding machine, and to servo circuits which individually drive and control corresponding servomotors of the shafts for injection, clamping, screw rotation, ejector and the like respectively through a servo interface 107. FIG. 4 shows only a servo circuit 101 associated with the injection servo motor 2 among such servo circuits.

Furthermore, a nonvolatile sheared RAM 103, constituted of a bubble memory or a CMOS memory, includes a memory section which stores an NC program for controlling actions of the injection molding machine, and a setting memory section which stores a variety of setting values, parameters, and macro variables. A bus arbiter controller 109 (referred to as a BAC hereinafter) is connected to each of the buses of the CPU 108 for NC, the CPU 110 for the PMC, the shared RAM 103, an input circuit 104, and an output circuit 105, for controlling the buses to be used. Additionally, a manual data input unit with a CRT display 114 (referred to as a CRT/MDI hereinafter) is connected via an operator panel controller 112 to the BAC 109 so as to input various instructions and setting data through manipulating control keys such as a soft key or a ten key. Moreover, a RAM 102, which is connected to the CPU 108 for NC through bus, is used for temporary storage of data or other applications.

FIG. 4 illustrates members only associated with an injection shaft, that is, the injection servo motor 2 which drives the screw 1 for injection, and the pulse coder 3 which is mounted on the injection servomotor 2 and detects the rotation of the servomotor to find out a screw position, whereas the other members associated with other shafts such as a closing shaft, a screw rotating shaft, and an ejector shaft are not shown. Also, for the servo circuits of the NC system 100, only the servo circuit for the injection servo motor is shown, and the servo circuits for the other shafts are omitted.

In the above configuration, the CPU 108 for NC distributes pulses via the servo interface to each of the servo circuits corresponding to the shafts in accordance with a programmed displacement instruction, and drives the servomotors associated with various shafts. Furthermore, the CPU 110 for the PMC performs a sequential control in the conventional manner.

Next, description will be made of the process of monitoring the relationship between the position of the screw 1 and the amount of resin injected into a mold.

Passage section where a flow resistance of the resin poured into a mold cavity changes largely is first determined in the mold cavity, whereby the cavity is partitioned into a plurality of regions, and then volumes of thus obtained regions are determined. The mold is isually designed by CAD (computer-aided design) system, and hence the volumes of the compartments can be each obtained easily.

Figure 3:
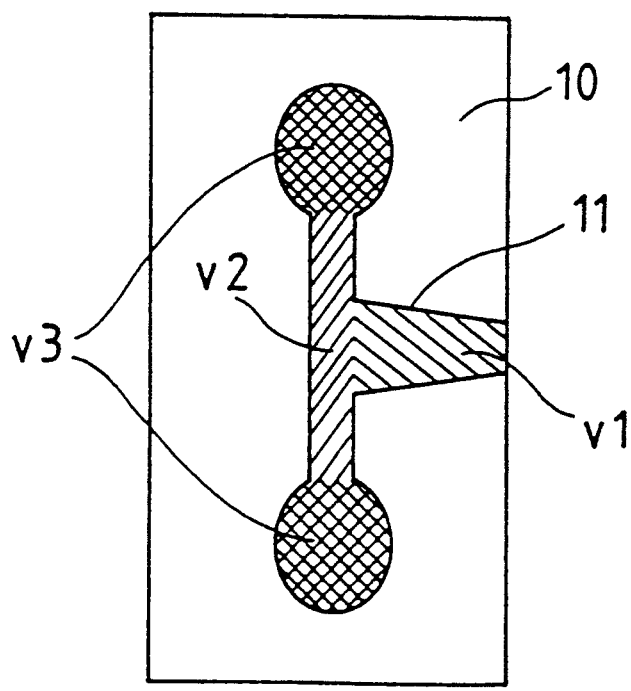
FIG. 3 is an explanatory drawing of the volumes with respect to the regions having different flow resistances in the mold cavity.

For example, in the case of a mold 10 having a cavity configuration 11 as shown in FIG. 3, the resin injected through a nozzle first fills the region designated by a volume v1 in FIG. 3, and subsequently enters the region designated by a volume v2 where not only the front end of the resin is made to turn at right angles but also subject to a great change in the sectional area of the passage, thereby causing a great change in the flow resistance. After filling the region specified by the volume v2, the resin advances to the regions specified by a volume v3 where the sectional area of the passage likewise greatly varies to change the flow resistance to a large extent. Accordingly, the cavity depicted in FIG. 3 provides two border sections at which the flow resistance changes, that is, a border section between the region designated by the volume v1 and the region designated by the volume v2, and border sections between the region indicated by the volume v2 and the regions indicated by the volume v3, each region hatched differently. Thus, these border sections delimit the regions designated by the volumes v1, v2, and v3 respectively, as shown in FIG. 3.

Figure 1:
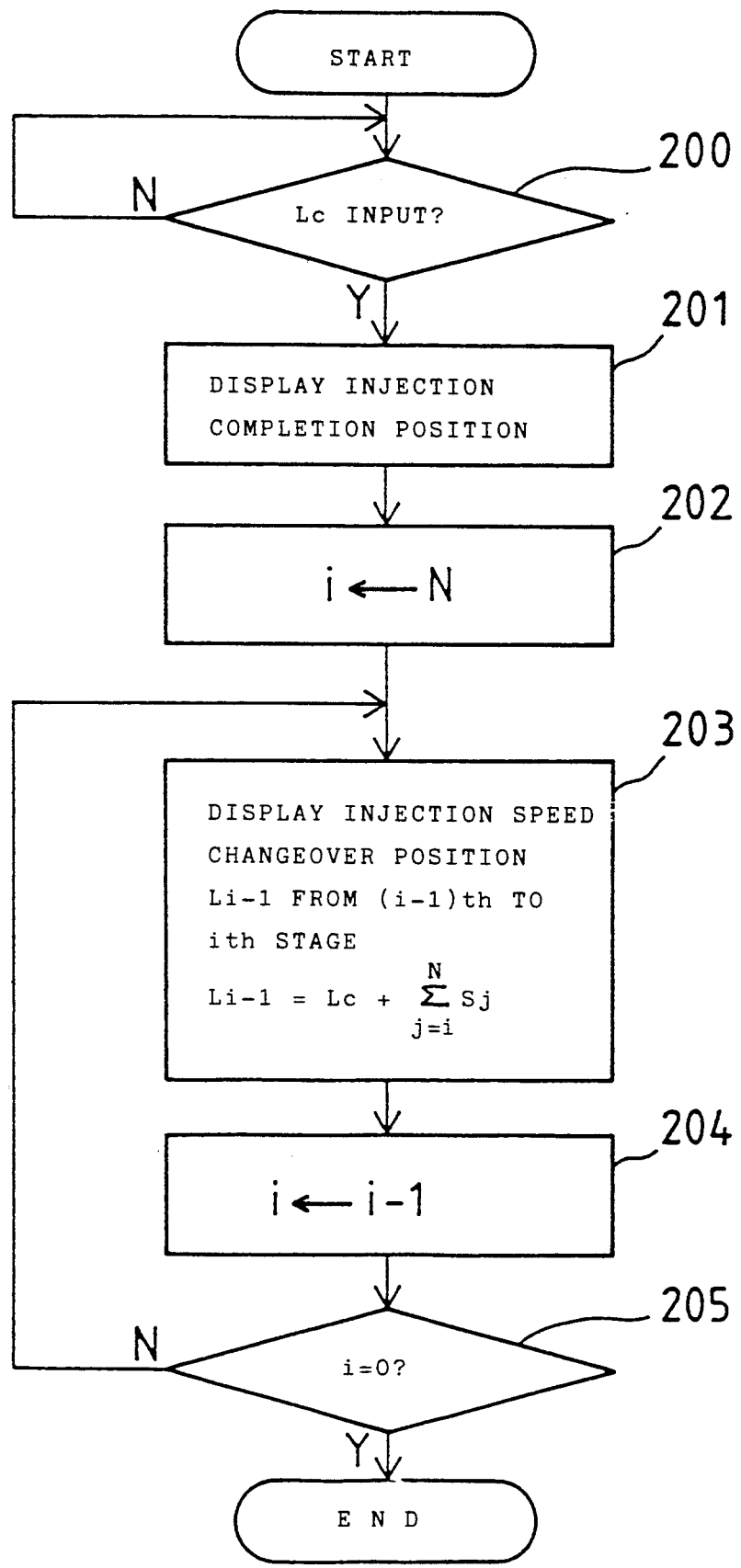
FIG. 1 is a flowchart of the in-cavity resin position monitoring process which is an embodiment of the present invention.

As described hereinbefore, the volumes v1 to vN of the partitioned regions each having different flow resistance are previously established in the order according to which each region is filled with the resin. The volumes v1 to vN of the regions are then set into the shared RAM 103 of the numerical control system through the CRT/MDI 114. Alternatively, the injection molding machine may be linked with the CAD system so that the volumes v1 to vN of the regions can be directly input into the numerical control system by way of the CAD system. Additionally, the above-mentioned volumes v1 to vN may be provided into the numerical control system by way of a storage device which stores features of the mold attached to the system and molding requirements for the use of that mold. When turning to a in-cavity resin position monitoring mode after the setting of the volumes v1 to vN, the CPU 110 for the PMC initiates a series of processes as shown by a flowchart in FIG. 1.

This process will thus be explained hereinbelow. It is first judged whether an amount of cushion Lc has been input or the amount of cushion Lc has been preset (Step 200). If the input or presetting has been made, then an injection completion position is displayed on a display screen of the CRT/MDI 114 (Step 201). The amount of the cushion Lc which has been set becomes equal in value to the injection completion position since the extremity of the heating cylinder 4 is usually positioned at the origin of the coordinates with the plus direction in which the tip of the screw goes away from the extremity of the cylinder 4. Afterwards, an index i is set at the number N of injection stages or the number N of the regions having differently set flow resistances (Step S 202), and a changeover position L i−1 from the (i−1)th stage to the ith stage is determined based on the following expression (2) to display the result on the display screen (Step 203).

$$L\,i-1 \;=\; Lc + \sum_{j=1}^{N} Sj$$
$$= Lc + \sum_{j=1}^{N} vj/[(D/2)^2 \cdot \pi] \quad (2)$$

Subsequently, "1" is subtracted from the index i to judge whether the index i is "0" or not (Steps 204 and 205). The processes from step 203 to step 205 are then repeated until the index i becomes "0" to display injection speed changeover positions LN−1 to L0 in sequence, and, when the index i reaches "0", these processes terminate.

Figure 2:
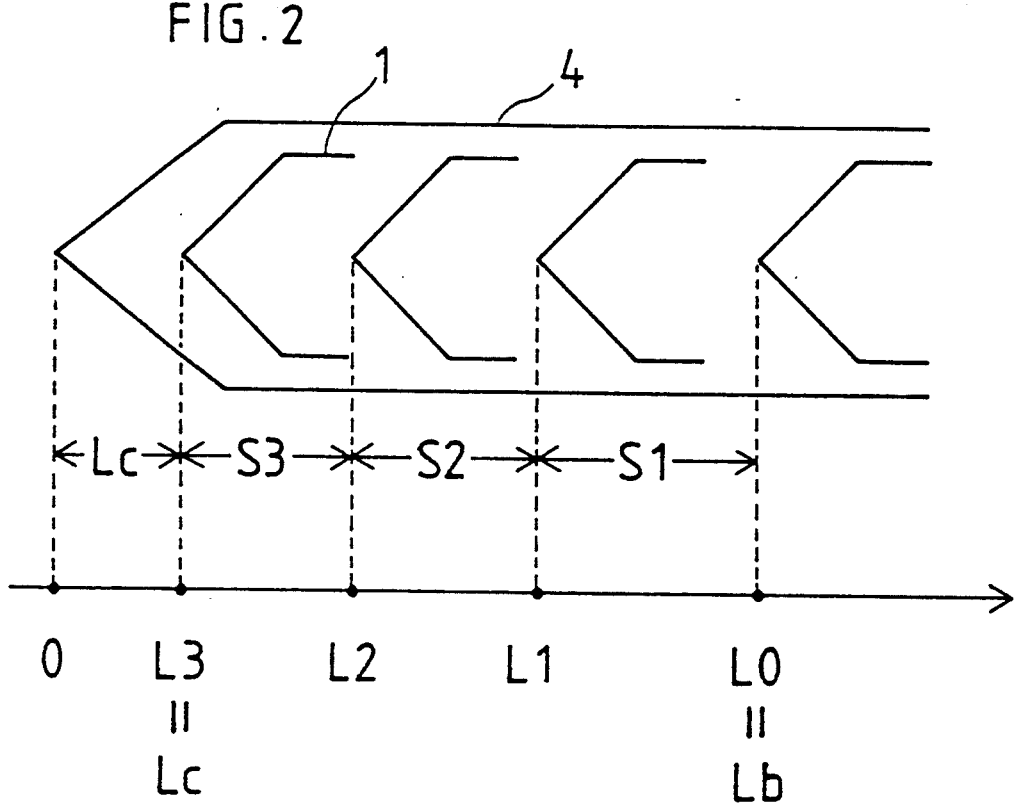
FIG. 2 is an explanatory drawing of the screw positions.

The above-described processes will be explained by way of an example with respect to the cavity having a configuration as shown in FIG. 3 (the case where the number of regions which have been provided or the number N of injection stages is "3"). As seen in FIG. 2, a picture of the cylinder 4 and a screw coordinate axis indicating the position of the screw disposed below the cylinder 4 first appear on the display screen of the CRT/MDI 114. Next, the injection completion position L3 corresponding to the amount of cushion Lc, which has been preset, is displayed on a predetermined display column of the display screen (Step 201). Simultaneously, on this display screen there appear the position L3 lying on the displayed screw coordinate axis as shown in FIG. 2, and a picture of the screw tip described correspondingly to the cylinder will be displayed on the screen. Then, the changeover position L2 (=Lc+S3) from the injection speed in the second stage to the injection speed in the third stage appear at the predetermined point on the display screen (Step 203). At the same time, the display screen presents the position L2 lying on the display screw coordinate axis, and a picture of the screw tip described correspondingly to the cylinder will be displayed on the screen. Furthermore, on the screen there appears similarly the changeover position L1 (=Lc+S2+S3) from the injection speed in the first stage to the injection speed in the second stage. Finally, the screw back position L0=Lb (=Lc+S1+S2+S3) will be displayed on the screen in the same manner as the above.

The injection speed changeover positions L0 to LN of respective stages thus displayed in series serve as reference positions in actually setting the injection speed changeover positions. The above-mentioned positions L1 and L2 may be possibly displaced slightly forward or backward in consideration of the requirements such as the viscosity of the resin, for example.

It is to be appreciated that on the display screen there may be displayed a picture showing the section of the mold cavity and the partitioned regions identified by hatching or the like as shown in FIG. 3, in addition to the values of the injection speed changeover positions and the pictures of the cylinder and the screw tip as have been displayed in the above example.

Moreover, in the above embodiment where the amount of cushion Lc is provided, the changeover positions are determined in sequence from the Nth stage (N denotes the number of the injection stages) to the first stage. Alternatively, when the screw back position Lb is set, or when it is determined based on the amount of cushion and the entire volume of the cavity, the changeover positions may be determined in the reverse order such as from the first stage to the second stage, from the second stage to the third stage, ... from the (N−1)th stage to the Nth stage, and from the Nth stage to the injection completion position, starting from the screw back position Lb which has been provided or found. In this case, the amount of screw stroke Si for each stage is sequentially added, starting from the amount of the screw stroke S1 for the first stage, and then the added amount is subtracted from the screw back position to determine the changeover position for each stage.

In the present invention, the screw position where each region is filled with the resin is found and displayed as the position where the injection speed is to be changed, based on the volume of each region having a different flow resistance in the cavity, thereby clearly defining the relationship between the amount of the resin to be injected into the cavity and the screw position. Thus, the injection speed changeover position can be easily set on the basis of the displayed screw changeover position, in consideration of the requirements such as, for example, viscosity of the resin. As the relationship between the state of the resin injected into the cavity and the screw position is presented to operators through display units, the information on the extent to which the cavity will be filled with the resin corresponding to the degree of the advance of the screw can be obtained, so that the overinjection of the resin during the search of the injection conditions and resulting damage of the cavity can be prevented.

What is claimed is:

1. A method of monitoring a resin position in a mold cavity, comprising the steps of:
   partitioning the mold cavity into a plurality of regions with border sections where flow resistance of poured resin undergoes a great change;
   setting volumes of thus partitioned regions into a control unit of an injection molding machine; and
   displaying on the display unit screw positions at the time when the front end of the resin reaches the border sections, and a screw back position, based on a screw diameter, the amount of cushion which has been set, and said volumes of the regions, through said control unit.

2. A method of monitoring a resin position in a mold cavity according to claim 1, wherein said injection molding machine is controlled by the control unit having a processor, and said volumes of the regions are determined at the time of designing the mold by CAD system so as to be set into said control unit.

3. A method of monitoring a resin position in a mold cavity according to claim 1, wherein on a display screen there appear a screw coordinate axis and a picture of a cylinder corresponding to said screw coordinate axis, and wherein on said screw coordinate axis there are plotted indexes each representing a screw back position, a screw position corresponding to the amount of the cushion, and screw positions where the front end of the resin reaches the border sections in the cavity so that the picture of the screw resting on each position can be correspondingly plotted on the cylinder being displayed.

4. A method of monitoring a resin position in a mold cavity according to claim 3, wherein said display screen further displays a picture of the cavity section and the border sections.

5. A method of monitoring a resin position in a mold cavity, comprising the steps of:
   partitioning the mold cavity into a plurality of regions with border sections where flow resistance of poured resin undergoes a great change;
   setting volumes of thus partitioned regions into a control unit of an injection molding machine; and
   displaying on the display unit screw positions at the time when the front end of the resin reaches the border sections in the cavity, based on a screw diameter, a screw back position which has been set, and said volumes of the regions, through said control unit.

6. A method of monitoring a resin position in a mold cavity according to claim 5, wherein said injection molding machine is controlled by the control unit having a processor, and said volumes of the regions are determined at the time of designing the mold by CAD system so as to be set into said control unit.

7. A method of monitoring a resin position in a mold cavity according to claim 5, wherein on a display screen there appear a screw coordinate axis and a picture of a cylinder corresponding to said screw coordinate axis, and wherein on said screw coordinate axis there are plotted indexes each representing a screw back position, a screw position corresponding to the amount of the cushion, and screw positions where the front end of the resin reaches the border sections in the cavity so that the picture of the screw resting on each position can be correspondingly plotted on the cylinder being displayed.

8. A method of monitoring a resin position in a mold cavity according to claim 7, wherein said display screen further displays a picture of the cavity section and the border sections.

* * * * *